United States Patent
Koo et al.

(10) Patent No.: US 6,615,644 B2
(45) Date of Patent: Sep. 9, 2003

(54) METHOD FOR CORRECTING THE SIGNAL OF A CAMSHAFT POSITION SENSOR

(75) Inventors: Jae-Bong Koo, Toulouse (FR); Franz Dietl, Toulouse (FR); Bennaceur Manssouri, Tournefeuille (FR)

(73) Assignee: Siemens VDO Automotive, Toulouse Cedex 1 (FR)

( * ) Notice: Subject to any disclaimer, the term of this patent is extended or adjusted under 35 U.S.C. 154(b) by 0 days.

(21) Appl. No.: 10/195,368

(22) Filed: Jul. 16, 2002

(65) Prior Publication Data
US 2003/0019284 A1 Jan. 30, 2003

(30) Foreign Application Priority Data
Jul. 25, 2001 (FR) ............................................. 01 09921

(51) Int. Cl.⁷ ............................................. G01M 15/00
(52) U.S. Cl. ..................................... 73/117.3; 73/117.3
(58) Field of Search ............................... 73/116, 117.2, 73/117.3; 123/414, 612, 613, 614, 617

(56) References Cited

U.S. PATENT DOCUMENTS 5,428,991 A  7/1995  Klenk et al.
5,469,823 A  11/1995  Ott et al.
5,497,748 A  * 3/1996  Ott et al. ..................... 123/414

FOREIGN PATENT DOCUMENTS

| DE | 40 28 442 | 3/1992 |
| EP | 0 438 192 | 5/1992 |

* cited by examiner

Primary Examiner—Kamand Cuneo
Assistant Examiner—Monica D. Harrison
(74) Attorney, Agent, or Firm—Young & Thompson

(57) ABSTRACT

Method for correcting the signal (30) of a sensor corresponding to the passage of teeth (20b) and of hollows (20d) of a target (20) secured to an engine camshaft, characterized in that duration measurement is used to evaluate the angular values ($\alpha_T, \alpha_N$) of the alternations (30b, 30d) of the signal corresponding to the teeth and to the hollows, these angular values are compared with the mechanical angles ($\gamma_T, \gamma_N$) of the teeth and of the hollows, and from this a phase shift ($\alpha_1, \alpha_2$) of the rising (30a) and falling (30c) fronts of the signal with respect to the corresponding flanks (20a, 20c) of the teeth of the target is deduced. When said teeth and hollows extend over equal angular sectors, the phase shifts are calculated directly by comparing the duration measurements of two consecutive alternations (30b, 30d) of the signal.

9 Claims, 1 Drawing Sheet

METHOD FOR CORRECTING THE SIGNAL OF A CAMSHAFT POSITION SENSOR

FIELD OF THE INVENTION

The present invention relates to a method for correcting the signal delivered by an angular position sensor, more specifically suited to such a sensor comprising a Hall-effect cell past which the teeth of a target of the toothed wheel type pass.

BACKGROUND OF THE INVENTION

Motor vehicles frequently make use of devices that measure the position and/or the rotational speed of rotating shafts, these devices consisting of sensors sensitive to the passage of the teeth of a toothed wheel, generally made of ferromagnetic material, secured to the rotating shaft. These sensors may be based on the principle of variable reluctance or, more recently, on the use of one or more Hall-effect cells. The latter make it possible to detect variations in magnetic flux which are generated by the passage of a magnetized tooth (if the sensor has no permanent magnet generating a reference magnetic flux) or a ferromagnetic tooth when the cell is associated with a permanent magnet, and thus deliver a rectangular electric signal representative of the passage of the teeth. These devices are encountered, for example, in the measurement of the position or speed of the crankshaft or camshaft in internal combustion engines, or alternatively in the measurement of the rotational speed of the wheels of the vehicle.

It has, however, been found that the electric signal delivered by these sensors was not an exact representation of the passage of the teeth past the sensor. What happens is that the rising and falling fronts of the electric signal may occur with a slight phase shift with respect to the precise passage of the rising or falling flank of the teeth of the target past the sensor, it being possible for this phenomenon to be attributed to the influence, in certain configurations, of the approach or retreat of the metal mass represented by the teeth with respect to the lines of flux passing through the Hall-effect cell. While this phase shift has only very little impact on applications such as the measurement of the rotational speed of a wheel of the vehicle, where it is essentially the period of the signal that is of interest, the same is not true of applications that make use of the rising and falling fronts of the signal in order to determine the position of a camshaft such as, for example, in applications aimed at measuring the camshaft timing with respect to top dead center in one cylinder in engines equipped with variable camshaft timing devices.

SUMMARY OF THE INVENTION

It is therefore an object of the present invention to propose a method that makes it possible to measure the phase shift between the electric signal delivered by the sensor and the actual mechanical position of the teeth passing past it, and in doing so, to correct this signal.

These objects of the invention, together with others which will become apparent in what follows of the present description, are achieved by means of a method for correcting the signal of a camshaft position sensor, said sensor delivering a rectangular signal corresponding to the passage of teeth and of hollows of a target secured to an engine camshaft whereby:

In a first embodiment of the method, the angular values of the alternations of the signal corresponding to the teeth and to the hollows are evaluated, these angular values are compared with the mechanical angles of the teeth and of the hollows, and from this a phase shift of the rising and falling fronts of the signal with respect to the corresponding flanks of the teeth of the target is deduced.

According to a first alternative form of this embodiment, the angular values of the alternations of the signal are evaluated by measuring the duration of said alternations as a function of the rotational speed of the engine.

Advantageously, evaluation may be performed over a period for which the engine is running at constant speed, or alternatively, the duration measurement may be corrected for the influences of a variation in speed by measuring at least two consecutive pairs of teeth/hollows.

According to another alternative form of this embodiment, the angular values of the alternations of the signal are evaluated on the basis of angular information delivered by a position sensor associated with a target secured to the engine crankshaft.

In a second embodiment of the method, which is applicable when said teeth and hollows extend over equal angular sectors, a phase shift of the rising and falling fronts of the signal with respect to the corresponding flanks of the teeth of the target is calculated by comparing duration measurements of two consecutive alternations of the signal.

Advantageously, in this embodiment too, the duration measurements may be made during a period for which the engine is running at constant speed, or may alternatively be corrected for the influences of a variation in speed by measuring at least two consecutive pairs of teeth/hollows.

BRIEF DESCRIPTION OF THE DRAWINGS

Other features and advantages of the method according to the invention will become apparent from reading the description which will follow and from examining the appended drawing, in which.

DETAILED DESCRIPTION OF THE INVENTION

Figure 1:
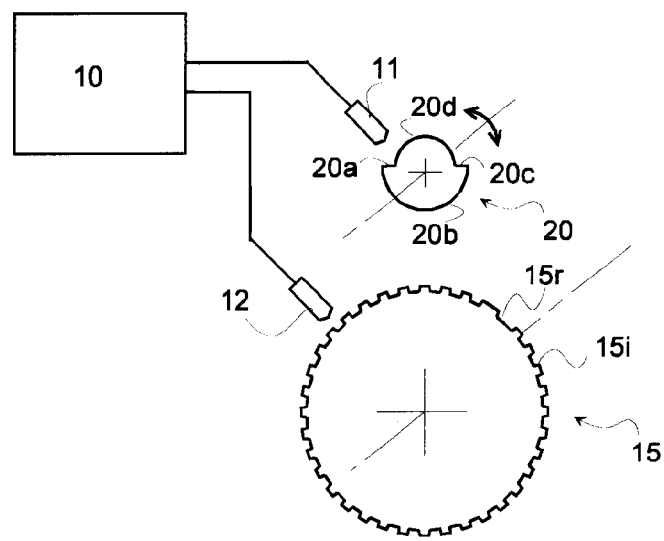
FIG. 1 schematically depicts a device suited to the implementation of the method according to the invention, and FIG. 2 graphically depicts a comparison between the mechanical profile of a target and the electric signal delivered by the associated sensor.

The reference 10 in FIG. 1 represents an internal combustion engine control computer. This computer is programmed to deliver control signals to actuators such as injectors, ignition coils, etc. (not depicted) on the basis of signals received from various sensors, just two of which have been represented. A camshaft position sensor 11 is placed facing a target 20 secured to the engine camshaft. This sensor supplies the computer 10 with a rectangular signal corresponding to the passage of teeth 20b and hollows 20d carried by the target 20, as the latter rotates with the camshaft. It will be noted that, for the convenience of the later explanations, a target 20 having just one tooth 20b and one hollow 20d extending over respective angular sectors equal to 180 degrees and separated by flanks 20a and 20c has been chosen. However, the method according to the invention is applicable to a target bearing any number of teeth and of hollows extending over respective angular sectors which may or may not be equal. The computer 10 is also able to receive a signal from a crankshaft position sensor 12, placed facing another target 15, secured to the crankshaft, and equipped with teeth 15i. This target may also be fitted with a mark 15r making it possible to determine top dead center for one of the cylinders of the engine. It is thus, for example, possible to measure the angular phase shift between the camshaft carrying the target 20 and the crankshaft secured to the target 15, which phase shift is introduced by a variable timing device (not depicted) embodied in FIG. 1 in the form of a double-headed arrow, by measuring the time or the angle separating detection of the rising flank 20a of the target 20 from the mark 15r of the target 15. However, if the detection of the flank 20a is affected by an error (which may be by as much as about 6 degrees), the measurement of the camshaft timing becomes erroneous. It is therefore important for this detection, performed by means of the signal delivered by the sensor 11, to be based on a signal corrected for these errors.

Figure 2:
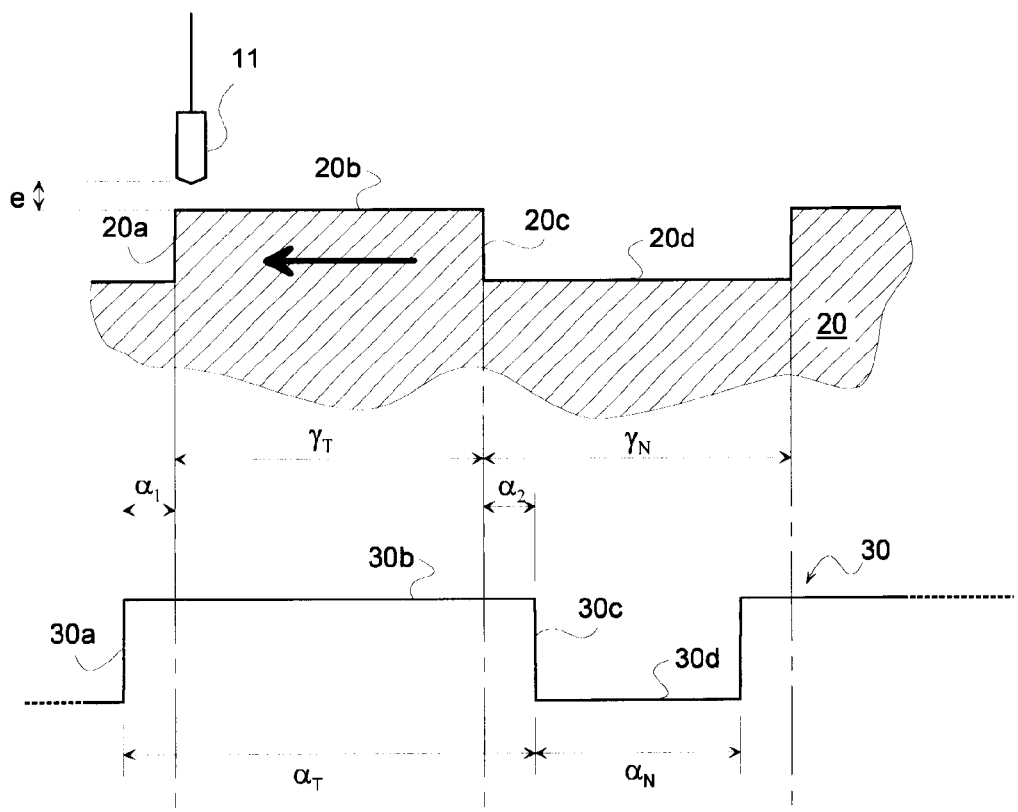

Reference is now made to FIG. 2 which depicts the target 20 in the form of a linear development, given a translational movement embodied by an arrow, past the sensor 11. The tooth 20b, delimited by rising 20a and falling 20c flanks, extends over a mechanical angle $\gamma_T$ and the hollow 20d, delimited by the falling flank 20c and the next occurrence of the rising flank 20a, extends over a mechanical angle $\gamma_N$. These mechanical angles are construction data and are precisely known.

Depicted in parallel as 30 is the signal delivered by the sensor 11. It may be seen that the rising front 30a of the signal 30 occurs with a phase shift $\alpha_1$ (phase lead) with respect to the rising flank 20a of the target. Likewise, the falling front 30c has a phase shift $\alpha_2$ (lag) with respect to the falling flank 20c. As a result, if considering a constant engine rotational speed, and therefore a constant (and known) angular velocity of the target 20, the tooth alternation 30b of the signal 30 has a duration representative of an angular value of the tooth alternation $\alpha_T$ that differs from the mechanical angle $\gamma_T$. The same is true of the angular value of the hollow alternation $\alpha_N$.

It has been found through testing that the phase shifts $\alpha_1$ and $\alpha_2$ are highly dependent on the gap e between the sensor 11 and the target 20 but that their absolute value is substantially equal or at the very least in a constant ratio regardless of this gap. This observation is then put to use in order to deduce their value and correct the signal 30.

In a first implementation of the method according to the invention, the angular value of the tooth alternation $\alpha_T$ is evaluated and compared with the known value of the mechanical angle of the tooth $\gamma_T$. The difference between these two values is equal to the sum of the phase shifts $\alpha_1$ and $\alpha_2$. Knowing the sum of the phase shifts and their ratio, it is then easy to calculate each phase shift. All that is then required is for a corresponding lag to be introduced into the phase shift $\alpha_1$ on the rising front 30a of the signal 30 in order to correct the latter. The same operation can be performed on the hollow.

To evaluate the angular value of the toothed alternation $\alpha_T$, all that is required is for its duration to be measured and, also knowing the rotational speed of the engine, for the angular velocity of the camshaft (generally half that of the crankshaft) to be deduced from it. The angular value is obtained as being the product of the duration and the angular velocity.

Of course, for the result to be reliable, it is important that the angular velocity be constant during the duration of the alternation considered. This is why the method according to the invention is preferably executed during a period for which the engine is running at constant speed, for example at idle where the measured durations are longer and the precision enhanced.

However, the method may also be executed when the speed varies, by correcting the duration measurements made as a function of this variation. To do that, it is observed that the period of the signal 30 is independent of the phase shifts, these canceling one another out over two tooth/hollow alternations. Thus, by measuring the duration of two consecutive tooth/hollow pairs, it is possible to deduce from this the variation in angular velocity that has occurred and to make corrections to the individual duration measurements for each tooth or hollow.

In a second alternative form of this embodiment, it is advantageously possible to make use of the signal delivered by the sensor 12 associated with the target 15. What happens is that this signal delivers relatively precise angular information because this information is based on the passage of far more numerous teeth (of the order of 60 teeth per revolution) at a speed twice that of the camshaft. Furthermore, as there is a fixed angular velocity ratio between the crankshaft and the camshaft, any variations in engine speed have no effect on the angular measurement delivered.

In the embodiment which has just been described, reference is made to the angular values of the alternations of the signal 30 and to a comparison between them and the mechanical angles of the teeth and hollows of the target 20. It is, however, possible to dispense with this intermediate step of conversion into angles when, as is most often the case, the teeth and hollows of the target 20 extend over equal angular sectors.

What then happens in this second embodiment is that the durations of the tooth 30b and hollow 30d alternations correspond to equal angular sectors. Assuming that the angular velocity remains constant while a tooth and a hollow move past, and that the phase shifts $\alpha_1$ and $\alpha_2$ are equal one another in terms of absolute value, it becomes immediately evident that the difference in the durations of the tooth and of the hollow is equal to four times the phase shift (in terms of duration). For n pairs of teeth/hollows on the target 20, the sum of the durations of the tooth and of the hollow, independent of the phase shift as was seen earlier, correspond to $1/n^{th}$ of a revolution. Thus, a quarter of the ratio of the difference in duration of the tooth and of the hollow to their sum immediately gives the angular value of the phase shift.

In the same way as in the first embodiment of the method according to the invention, these calculations are preferably carried out during a period for which the engine is running at constant speed so as to have a constant angular velocity. However it would also, still in a similar way, be possible to correct the measurement of the durations by determining the influence that a variation in speed has by measuring the duration of two consecutive tooth/hollow pairs.

Of course, the invention is not restricted to the embodiment described and depicted, which was given merely by way of example. Thus, it is not necessary for a rising front of the signal 30 to correspond to a rising flank of a tooth of the target 20. The signal could be inverted, depending on the embodiment of the sensor 11. Likewise, any form of correction of the signal 30, once the phase shifts $\alpha_1$ and $\alpha_2$ are known, can be used, whether this involves introducing lags to the rising fronts, recreating an artificial signal or correcting by calculation the camshaft angular timing values obtained from the raw signal.

The method according to the invention thus makes it possible to get around a time-consuming and expensive step of adjusting the gap e of the sensor 11 or alternatively of using a less precise sensor which is less expensive to manufacture. In addition, by repeating the method at regular intervals throughout the life of the vehicle, it is possible to get around drifts due to age and wear of the parts.

What is claimed is:

1. A method for correcting a rectangular signal from a camshaft position sensor that corresponds to passage of a tooth and a hollow of a target secured to a camshaft of an engine, the method comprising the steps of:

comparing angular values ($\alpha_T$ and $\alpha_N$) of alternations of the rectangular signal to mechanical angles ($\gamma_T$ and $\gamma_N$) of the tooth and the hollow and, based on this comparison, calculating a first phase shift ($\alpha_1$) of a rising face of the rectangular signal with respect to a corresponding flank of the tooth and a second phase shift ($\alpha_2$) of a falling face of the rectangular signal with respect to a corresponding flank of the tooth, wherein a difference between the angular values ($\alpha_T$ and $\alpha_N$) and the mechanical angles ($\gamma_T$ and $\gamma_N$) and a ratio between the first phase shift ($\alpha_1$) and the second phase shift ($\alpha_2$) are used to calculate the first and second phase shifts ($\alpha_1$, $\alpha_2$).

2. The method according to claim 1, wherein the angular values ($\alpha_T$, $\alpha_N$) of the alternations are evaluated by measuring a duration of the alternations as a function of the rotational speed of the engine.

3. The method according to claim 2, wherein the evaluation is performed over a period for which the engine is running at constant speed.

4. The method according to claim 2, wherein the duration measurement is corrected for the influences of a variation in speed by measuring at least two consecutive pairs of the tooth and hollow.

5. The method according to claim 1, wherein the angular values ($\alpha_T$, $\alpha_N$) of the alternations are evaluated on the basis of angular information delivered by a position sensor associated with a target secured to the engine crankshaft.

6. The method of claim 1, wherein the comparing step is made on two consecutive alternations of the rectangular signal.

7. The method according to claim 6, wherein the calculation is performed over a period for which the engine is running at constant speed.

8. The method according to claim 6, wherein the comparison is corrected for the influences of a variation in speed by measuring at least two consecutive pairs of the tooth and hollow.

9. A method for correcting a rectangular signal from a camshaft position sensor that corresponds to passage of a tooth and a hollow of a target secured to a camshaft of an engine, the method comprising the steps of:

determining a difference between an angular value ($\alpha_T$) of an alternation of the rectangular signal and a corresponding mechanical angle ($\gamma_T$) of the tooth;

determining a ratio between a first phase shift ($\alpha_1$) of a rising face of the rectangular signal with respect to a corresponding flank of the tooth and a second phase shift ($\alpha_2$) of a falling face of the rectangular signal with respect to a corresponding flank of the tooth;

calculating the first and second phase shifts ($\alpha_1$, $\alpha_2$) from the determined difference and the determined ratio; and correcting the rectangular signal using the calculated phase shifts.

* * * * *